United States Patent [19]

Eisenhardt

[11] 3,998,275

[45] Dec. 21, 1976

[54] EARTHWORKING IMPLEMENT AND ROW GUIDE APPARATUS

[75] Inventor: Fred W. Eisenhardt, Fargo, N. Dak.

[73] Assignee: Alloway Manufacturing Inc., Fargo, N. Dak.

[22] Filed: May 6, 1975

[21] Appl. No.: 574,912

Related U.S. Application Data

[63] Continuation-in-part of Ser. No. 474,048, May 28, 1974, abandoned.

[52] U.S. Cl. .................................. 172/26; 172/134; 172/142; 172/196; 172/519; 172/530; 172/676; 172/708

[51] Int. Cl.² .................. A01B 69/00; A01B 49/02; A01B 79/02

[58] Field of Search ............ 172/26, 126, 134, 142, 172/149, 151, 174, 175, 176, 177, 179, 180, 181, 184, 187, 195, 196, 200, 316, 413, 430, 519, 671, 676, 691, 708, 764, 530

[56] References Cited

UNITED STATES PATENTS

| 549,247 | 11/1895 | Moser | 172/180 |
|---|---|---|---|
| 964,384 | 7/1910 | Brigden | 172/708 |
| 1,019,199 | 3/1912 | Sutton | 172/26 |
| 1,678,910 | 7/1928 | Keller | 172/180 X |
| 2,712,780 | 7/1955 | Graham | 172/708 X |
| 3,047,077 | 7/1962 | Simpson et al. | 172/519 |
| 3,550,689 | 12/1970 | Keck et al. | 172/175 X |
| 3,840,076 | 10/1974 | Capehart | 172/26 X |

Primary Examiner—Richard T. Stouffer
Attorney, Agent, or Firm—Burd, Braddock & Bartz

[57] ABSTRACT

An earthworking implement mounted on a three-point hitch of a draft vehicle with a hitch assembly. The hitch assembly has L-shaped members mounted in clamps secured to a main transverse beam. A plurality of parallel linkages movably connect a transverse tool bar to the beam. Row guide units having longitudinally aligned guide wheels and furrowing tools are mounted with clamps to the tool bar. Earthworking tools are mounted with clamps to the tool bar. In one form, the earthworking tool is a blade sequentially moved into and out of the soil with a lifting wheel to dig water and snow holding basins or trenches in the soil.

35 Claims, 21 Drawing Figures

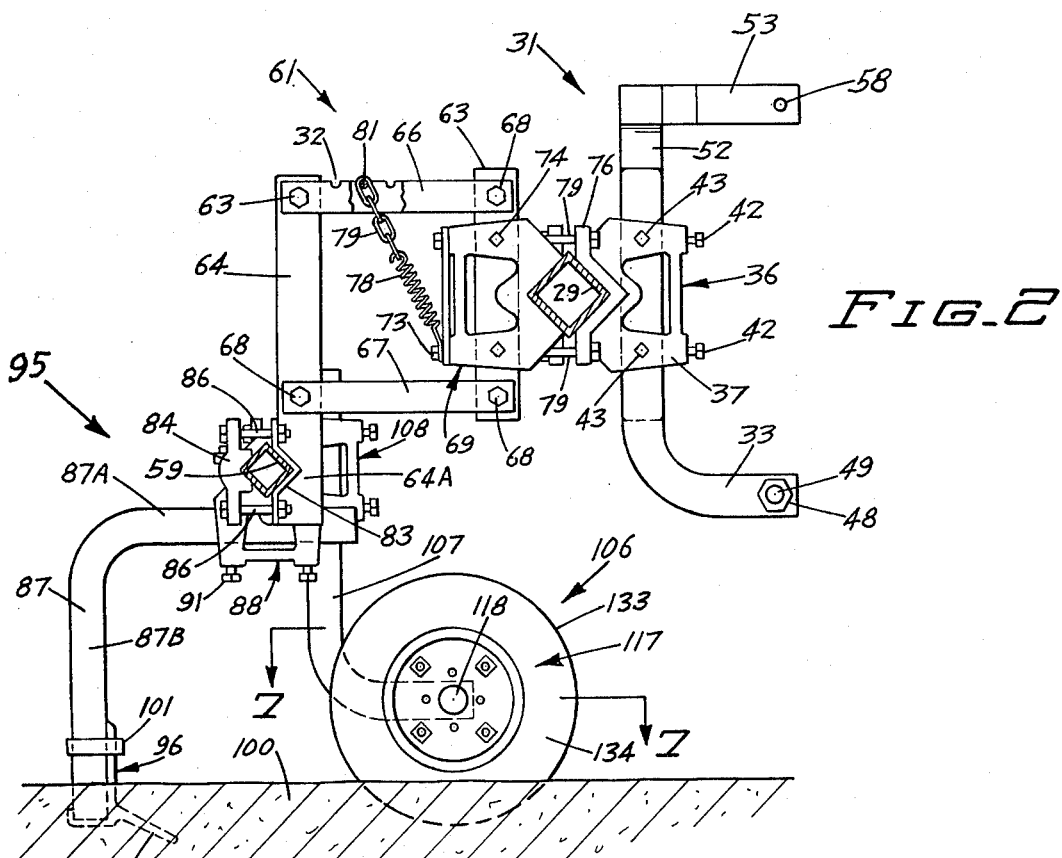
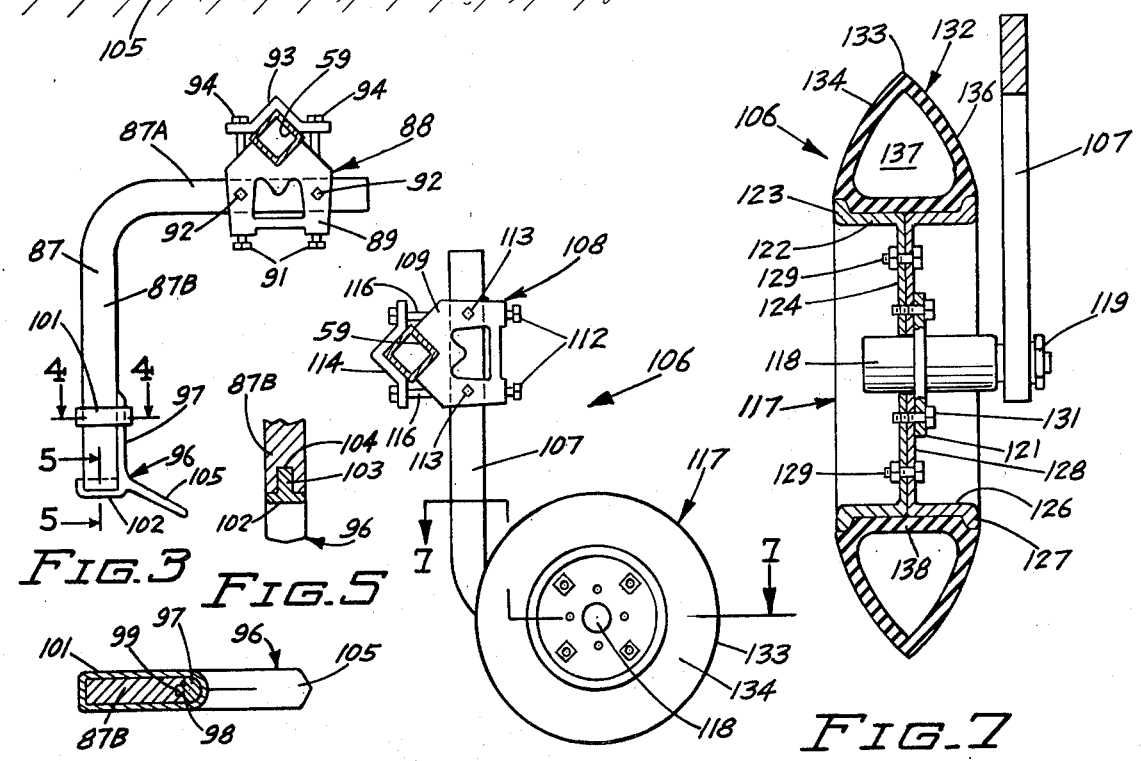

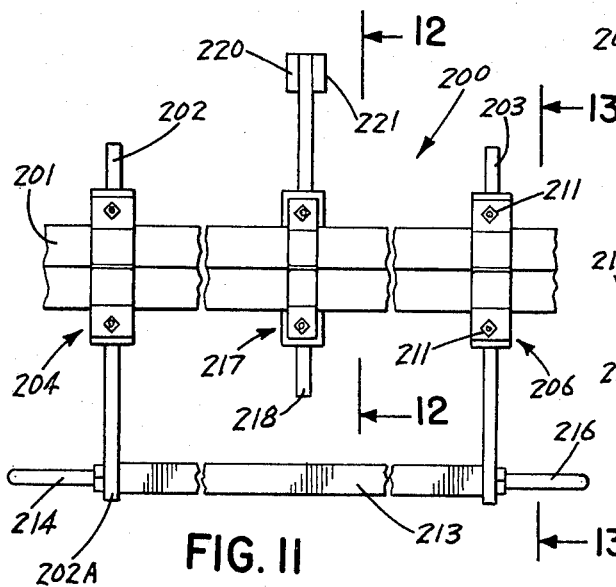
FIG. 11
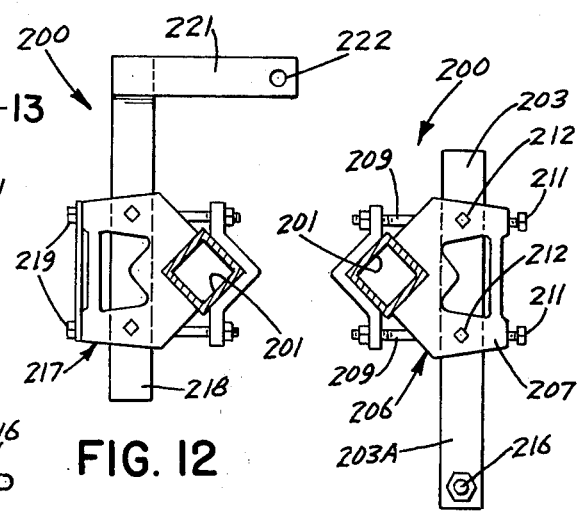
FIG. 12  FIG. 13
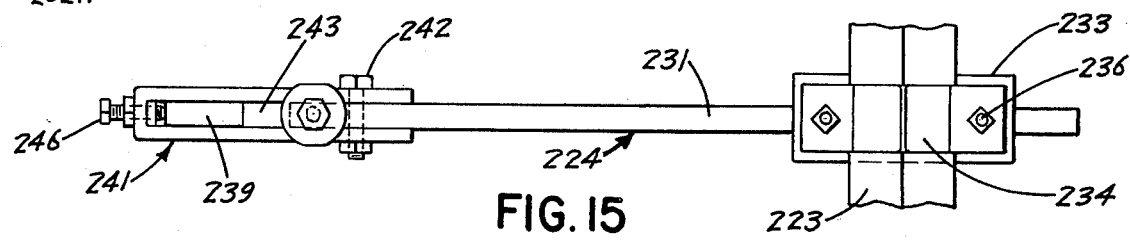
FIG. 15
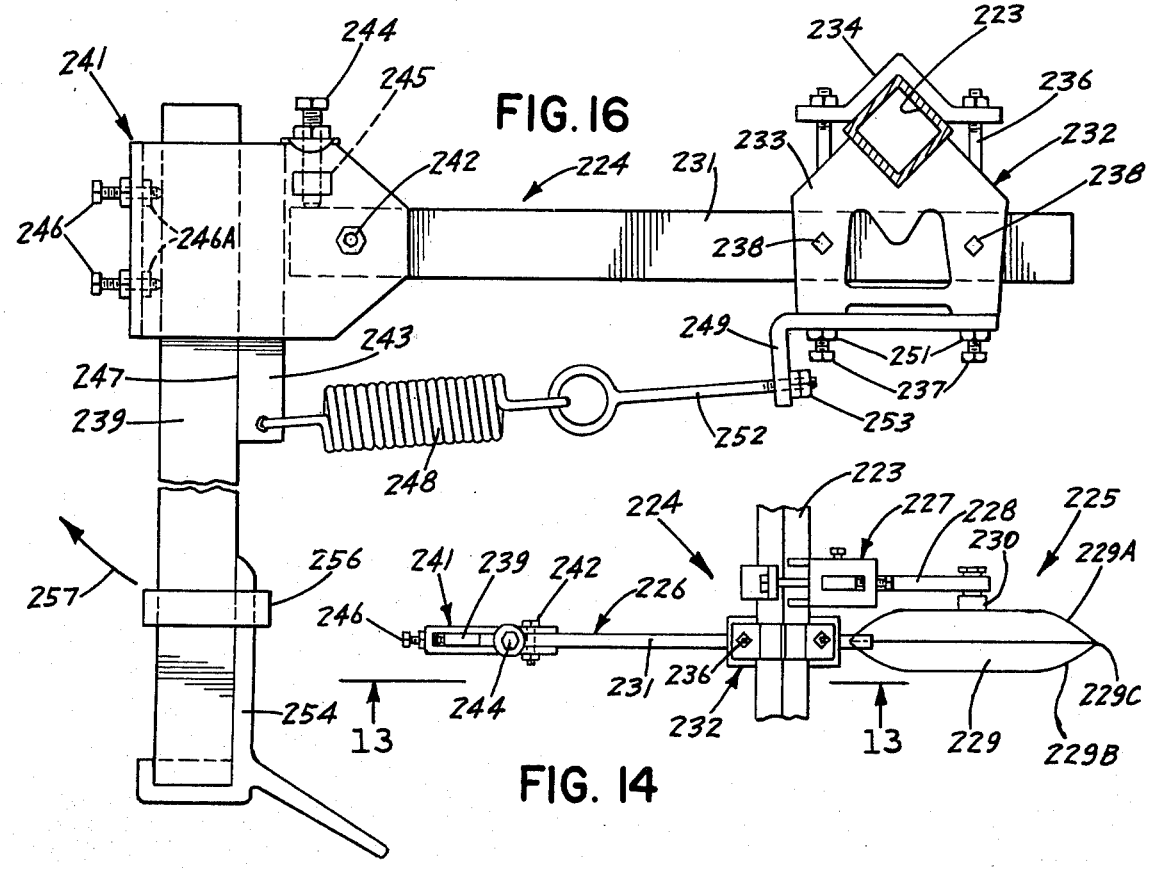
FIG. 16
FIG. 14

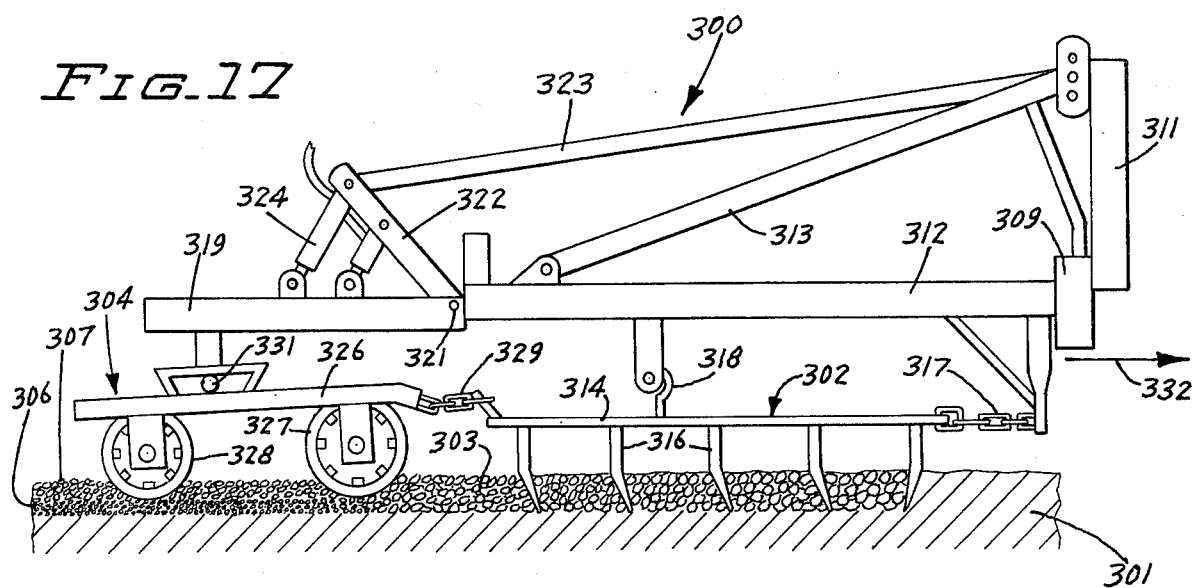
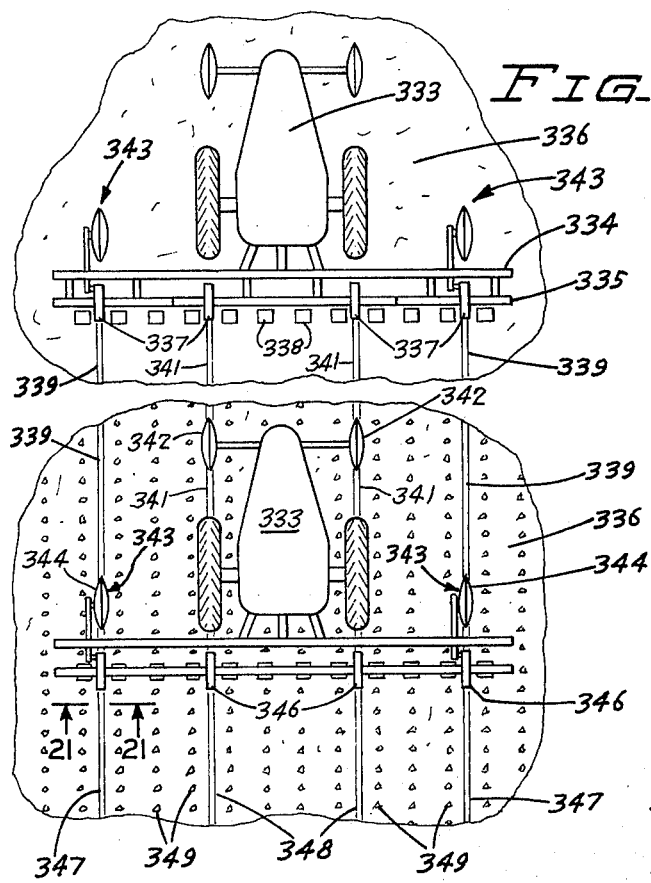
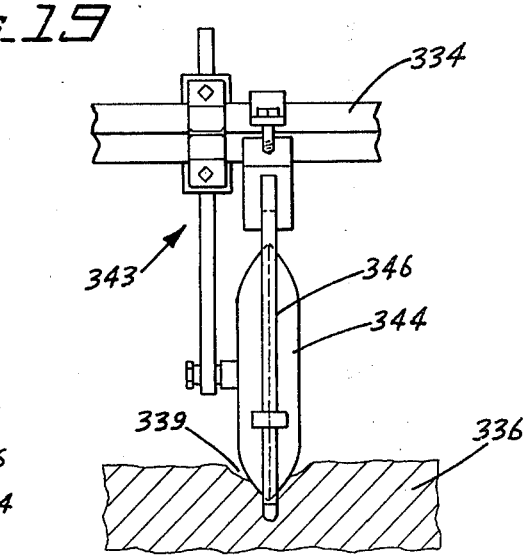
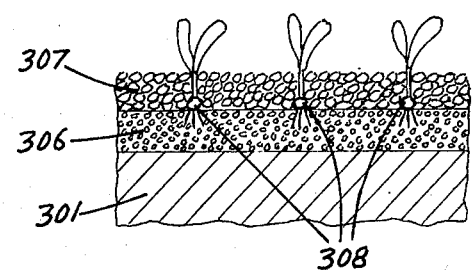

EARTHWORKING IMPLEMENT AND ROW GUIDE APPARATUS

CROSS REFERENCE TO RELATED APPLICATION

This application is a continuation-in-part of U.S. Pat. application Ser. No. 474,048 filed May 28, 1974 now abandoned.

BACKGROUND OF INVENTION

Row crop cultivators mounted on three-point hitches of tractors are used to cultivate a plurality of rows of crops, as beets, beans, corn and the like. An example of a row crop cultivator is shown in U.S. Pat. No. 3,680,648. The cultivator has a plurality of earthworking tools mounted on a transverse tool bar. The cultivators are guided by driving the cultivator draft vehicle along the rows. This requires accurate vehicle control and is not suitable for precision cultivation of row crops, as sugar beets. Some cultivators have steering mechanisms which require an operator to guide the earthworking tools along the rows of crops. The additional operator adds to the labor and costs of the cultivation process.

Conservation farming systems utilizing ridge planning for row crops have been developed to optimize management of crop residues, minimize soil losses and erosion and lower farming costs. A prime mover, as a tractor or transporter, having all-terrain tires has a tool bar for carrying different types of equipment including earthworking equipment. The tires of the transporter follow the pre-established traffic patterns between the ridges of the row crops.

The basin method of planting row crops has been used to control soil erosion and conserve soil moisture. The basin method and a basin lister is described by Shedd in the *Agricultural Engineering Journal*, Volume 16, No. 4, pages 133–136.

SUMMARY OF INVENTION

The invention relates to an earthworking implement attached to a draft vehicle with a hitch assembly. The hitch assembly has a plurality of members adjustably connected with clamps to a main transverse beam. A tool bar is movably connected to the beam and carries a plurality of row guide units. Each row guide unit has a guide and gauge wheel, as a resilient rubber wheel, and a furrowing tool. The rubber wheel has an annular chamber and is deformable so as to follow the furrows in the field made by a furrowing tool. An earthworking tool means, herbicide incorporator or seed planter can be mounted on the tool bar.

In one embodiment of the invention the furrowing tool has an upright standard that is biased to a ground working position. An earthworking tool is mounted on the standard. The standard is operable to allow the tool to trip to move over an object, as a rock. Biasing means operates to return the standard to its normal earthworking position.

The earthworking tool secured to the tool bar can be a ditcher operable to make separate trenches or basins in the surface of the soil to collect water and snow so as to minimize water runoff and soil erosion. The earthworking tool has a rotatable wheel means operable to sequentially move a trenching tool in a manner to make separate trenches or basins in the soil.

An object of the invention is to provide a row crop implement and draft vehicle for the implement with apparatus that follows previously made soil tracks or furrows in the soil. Another object of the invention is to provide row guide structure for a row crop cultivator operable to guide earthworking tools along rows of crops. An additional object of the invention is to provide an earthworking assembly operable to form separate trenches or basins in the soil.

A further object of the invention is to provide a row crop cultivator with an adjustable hitch assembly operable to level the transverse beam of an implement, as a cultivator, planter or the like. Yet another object of the invention is to provide a versatile and adjustable hitch assembly which can fit variations in three-point tractor hitches and is adaptable to the other mounting structure of draft vehicles. Another object of the invention is to provide a versatile, low cost hitch assembly usable with a variety of implements mountable on the three-point hitch of a draft vehicle. Still another object of the invention is to provide a furrowing tool assembly with a spring trip release that allows the tool to ride over an object, as a rock, and automatically return the tool to its normal earthworking position. These and other objects and advantages of the invention are found in the following specification of a preferred embodiments of the invention.

IN THE DRAWINGS

FIG. 2 is a sectional view taken along the line 2—2 of FIG. 1;

FIG. 3 is a sectional view taken along the line 3—3 of FIG. 1;

FIG. 4 is an enlarged sectional view taken along the line 4—4 of FIG. 3;

FIG. 5 is an enlarged sectional view taken along the line 5—5 of FIG. 3;

FIG. 6 is a sectional view taken along the line 6—6 of FIG. 1;

FIG. 7 is an enlarged sectional view taken along the line 7—7 of FIG. 6;

FIG. 11 is a foreshortened elevational view of a modified hitch assembly mounted on a transverse beam of an implement;

FIG. 12 is a sectional view taken along the line 12—12 of FIG. 11;

FIG. 13 is a sectional view taken along the line 13—13 of FIG. 11;

FIG. 14 is a top plan view of a modified row guide structure of the invention mounted on a transverse tool bar;

FIG. 15 is an enlarged top plan view of the furrowing tool assembly of the row guide structure of FIG. 14;

FIG. 16 is an enlarged sectional view taken along the line 16—16 of FIG. 14;

FIG. 17 is a side elevational view of an earthworking implement for preparing a seed bed according to the invention, FIG. 18 is a diagrammatic sectional view showing germinated seeds in the seed bed;

FIG. 19 is a diagrammatic plan view of a draft vehicle and implement of the invention on a seed bed operable to make row guide furrows in the seed bed;

FIG. 20 is a plan view similar to FIG. 19 showing a draft vehicle and row crop cultivator guided along the longitudinal furrows in the soil with the row guide structure of the invention; and FIG. 21 is an enlarged sectional view taken along lines 21—21 of FIG. 20.

DESCRIPTION OF THE PREFERRED EMBODIMENT

Figure 1:
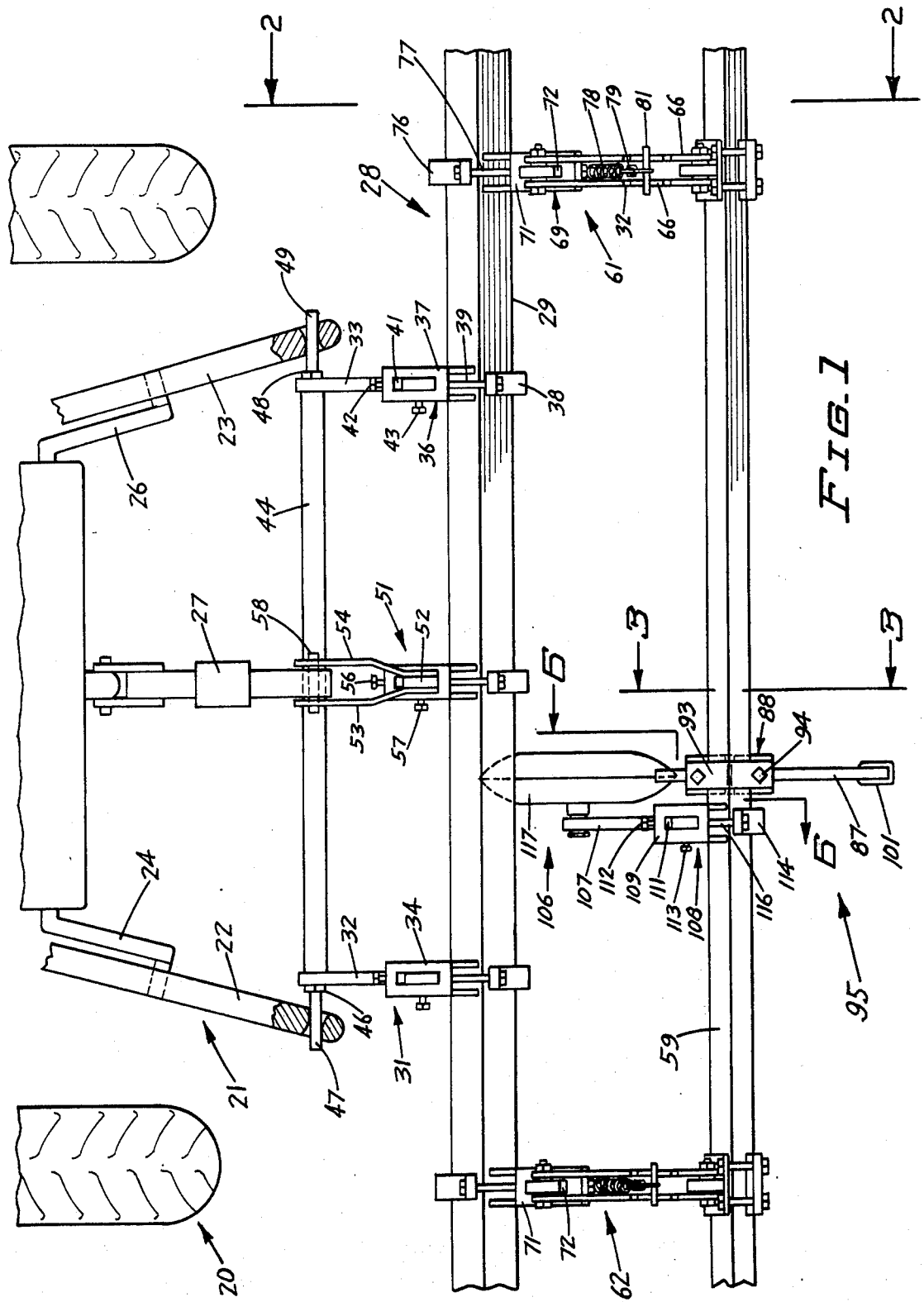
FIG. 1 is a plan view of a fragmentary portion of the earthworking implement of the invention attached to a three-point hitch of a draft vehicle.

Referring to the drawing, there is shown in FIG. 1 a transporter, power unit or draft vehicle, as an agricultural tractor, indicated generally at 20 having a pair of drive wheels 20A located on opposite sides of the power transmission housing 20B. A conventional three-point hitch indicated generally at 21 extends rearwardly from the transmission housing 20B. Three-point hitch 21 has a pair of draft links 22 and 23 connected to lift links 24 and 26. Located between lift links 24 and 26 is a rearwardly directed center control link 27.

An implement indicated generally at 28 is mounted on three-point hitch 21. Implement 28 has a transverse beam 29 carrying a hitch assembly indicated generally at 31. Hitch assembly 31 is mounted on the draft links 22 and 23 and control link 27. Hitch assembly 31 comprises a pair of generally L-shaped members 32 and 33. A first clamp 34 secures the L-shaped member 32 to the beam 29. In a similar manner, a second clamp 36 secures the member 33 to beam 29. Clamps 34 and 36 are identical in structure. The following description is limited to clamp 36.

Clamp 36 is a clamp as shown in U.S. Pat. Nos. 3,642,333 and No. 3,825,358. Clamp 36 has a body 37 located on one side of beam 29. A back or retaining member 38 is located on the opposite side of beam 29. A pair of bolts 39 clamp the body 37 to member 38 to fix the position of the clamp on beam 29. The body 37 has an upright opening or passage 41 for accommodating the upright section 33A of the L-shaped member 33. Adjusting and holding bolts 42 cooperate with captive nuts (not shown) held in body 37 to engage the forward edge of upright section 33A and longitudinally clamp section 33A in the body 37. A pair of side adjusting and holding bolts 43 cooperate with nuts (not shown) captivated in body 37 and engage one side of section 33A to laterally or transversely clamp section 33A in body 37. L-shaped members 32 and 33 have forwardly directed lower sections or legs 32B and 33B, respectively. The forward portions of sections 32B and 33B have transverse holes for accommodating bolts (not shown) threaded into a transverse member 44. A bolt 46 holds one end of member 44 on section 32B. An outwardly directed end or projection 47 cooperates with the holding portion of the draft link 22 to mount one side of the hitch assembly 31 to draft link 22. The opposite end of member 44 is held on section 33B with a bolt 48. An outwardly directed arm or projection 49 cooperates with the end of draft link 23 to mount the opposite or right end, as shown in FIG. 1, on draft link 23.

A third clamp indicated generally at 51 is located midway between clamps 34 and 36. Clamp 51 accommodates upright L-shaped member 52 having a pair of forwardly directed arms 53 and 54. Adjusting and holding bolts 56 and 57 engage the front edge and side of upright member 52 to clamp the member 52 to the body of clamp 51. Clamp 51 is identical in structure to clamps 34 and 36. The forward ends of arms 53 and 54 have transverse aligned holes accommodating a pin 58. Pin 58 pivotally connects the control link 27 to the arms 53 and 54. Each of the upright portions 32A and 33A is selectively positioned in its respective clamp 34, 36, 51 so that the beam 29 can be leveled on the three-point hitch 21. The upright center member 52 is adjustable in clamp 51, thereby adjusting the location and elevation of the control link to provide for angular or pivotal control of the beam 29. The individual adjustment of the L-shaped members 32 and 33 and upright member 52 permits the hitch assembly 31 to fit variations in the structure of three-point hitches of different types of tractors.

As shown in FIGS. 1 and 2, a tool bar 59 is located generally parallel to, rearward and below the beam 29. A plurality of parallel linkages indicated generally at 61 and 62 connect tool bar 59 to beam 29. The number of parallel linkages can vary with the length of beam 29. Preferably, two parallel linkages are used for each section of tool bar 29. For example, a tool bar 59 having three sections would have six parallel linkages. Parallel linkages 61 and 62 are identical in structure. The following description is limited to parallel linkage 61 shown in FIG. 2.

Parallel linkage 61 has a first upright member 63 and a second upright member 64 located rearward of the first member 63. A first or top horizontal link 66 connects the upper ends of members 63 and 64. A second or bottom horizontal link 67 connects the lower end of member 63 with an intermediate portion of member 64. Pivot bolts 68 pivotally connect the opposite ends of members 66 and 67 to members 63 and 64.

A clamp indicated generally at 69 mounts the parallel linkage 61 to the beam 29. Clamp 69 is identical in structure to clamps 34 and 36. Clamp 69 has a body 71 having an upright opening or passage 72 for accommodating the upright member 63. Horizontal and transverse adjusting and holding bolts 73 and 74 fix the position of members 63 in the body 71. Clamp 69 has a back or retaining member 76 connected with a pair of bolts 77 to the body 71 to thereby fix the position of the clamp on beam 29.

The parallel linkage 61 is biased in a downward direction by a spring 78. The lower end of spring 78 is attached to the lower bolt 73. The upper end of spring 78 is connected to a link chain 79. A transverse rod 81 extends through one of the links. The ends of the rods are located in grooves 82 in the top links 66. The links 66 have a plurality of horizontally spaced grooves so that the position of rod 81 can be changed and thereby change the tension characteristics of spring 78.

The upright member 64 has a downwardly directed lower end 64A secured to a rearwardly open V-notched plate 83. The tool bar 59 is located in the V-notched plate. A back or retaining member 84 is clamped to the plate 83 with a plurality of bolts 86.

The row guide structure, indicated generally at 95, for the row crop implement comprises an earthworking furrowing tool assembly 96 and a forwardly positioned guide and gauge wheel assembly 106 located in longitudinal alignment with each other. A plurality of row guide structures 106 are used to guide the tool bar 59 and tools or units attached to the tool bar 59 relative to the rows of plants. Two furrowing assemblies 96 are used to make longitudinal furrows for the front wheels of the tractor. The tractor is guided along the field by two longitudinal furrows made in a previous cultivation, planting, or herbicide operation.

Furrowing tool assembly 96 has a generally right angle standard 87 for attaching a tool 96 to tool bar 59. Standard 87 has a forwardly directed horizontal section 87A and a generally vertical section 87B. A clamp indicated generally at 88 attaches the standard 87 to the tool bar 59. Clamp 88, as shown in FIG. 3, has a body 89 having an opening or passage for accommodating forwardly directed portion or section 87A of standard 87. Adjusting bolts 91 and 92 vertically and horizontally fix the position of section 87A on body 89. A back or retaining member 93 is connected to body 89 with a pair of bolts 94. The bolts clamp the body and retaining member on tool bar 59.

Tool 96 is located on the lower end of standard section 87B. Tool 96 has an upwardly directed shank 97 having a rearwardly directed projection 98. Projection 98, as shown in FIG. 4, extends into a hole 99 in the standard section 87B. A continuous annular collar 101 extends about section 87B and shank 97 to hold the projection in hole 99. The collar 101 is frictionally held on the standard 97 and tool 96. The lower end of shank 97 is integral with a rearwardly directed base 102. Base 102 has an upwardly directed rib 103 located in a groove 104. As shown in FIG. 5, groove 104 is located in the bottom of standard section 87B. The tool 96 has a forwardly and downwardly directed nose 105 which extends into the soil 100.

Tool 96 can be readily and quickly removed from standard 87. This is accomplished by forcing collar 101 in an upward direction. The tool can pivot in a forward direction so that the projection 98 is removed from hole 99. The tool can then be moved downwardly off the standard 87.

Referring to FIGS. 2, 6 and 7, the guide and gauge wheel assembly indicated generally at 106 has an upright generally L-shaped standard 107. A clamp 108 attaches the standard 107 to the tool bar 59. Clamp 108 is identical in structure to clamp 88. Clamp 108 has a body 109 having an opening 111 accommodating standard 107. Adjusting and holding bolts 112 and 113 fix the position of standard 107 on body 109. A back or retaining member 114 is connected to body 109 with a pair of bolts 116.

A wheel 117 is located adjacent the forward portion of the lower end of standard 107. Wheel 117 has a bearing or hub 118 attached to the standard 107 with nut and bolt assembly 119. The midsection of bearing 118 has an annular outwardly directed flange 121. Wheel 117 is connected to flange 121. Wheel 117 has a first rim 122 having an outside upwardly directed rib or flange 123. The inside of rim 122 has an inwardly directed circular flange 124. A second rim 126 has an outside outwardly directed flange 127 similar to flange 123. The inside of rim 126 has an inwardly directed flange 128. A plurality of circumferentially spaced nut and bolt assemblies 129 secure flanges 124 and 128 in face-to-face relationship. Lugs or bolts 131 connect both flanges 124 and 128 to the hub flange 121.

A resilient tire indicated generally at 132 is mounted on rims 122 and 126 between the flanges 123 and 127. The tire has a central outwardly directed apex or annular rib section 133 and convex sides 134 and 136. Sides 134 and 136 converge toward and join at the rib section 133. The base 138 of tire 132 extends between flanges 123 and 127. Tire 132 has an annular chamber 137. As shown in FIG. 7, chamber 137 has a generally triangular shape. The walls of the tire are flexible material, such as rubber or synthetic plastics. Also, the walls of the tire have substantially uniform thickness. The tire 132 follows the furrow previously made in the soil to thereby position the tool bar 59 relative to the rows of crops. Tool 96 functions to make a longitudinal furrow between selected rows of crops for subsequent cultivation. The resilient tire 132 functions to follow the previously made furrow without cutting into the soil and drifting from the furrow. The resiliency of the tire permits it to deform and move over irregularities in the soil and obstacles without laterally shifting the position of the tool bar 59. This provides for accurate tracking of the cultivator and precision cultivation. Wheel 117 also functions as a gauge wheel for determining the height of the tool bar 59. The height of the tool bar 59 is adjustable by repositioning standard 107 relative to the clamp 108.

The tool bar 59 can accommodate various types of earthworking tools. For example, the dual disc tools shown in U.S. Pat. No. 3,642,333 can be mounted on the tool bar 59. The herbicide incorporator shown in U.S. Pat. No. 3,741,137 can be mounted on the tool bar 59. Also, other implements as seeder units, and trenching and damming units can be mounted on the tool bar 59.

Figure 8:
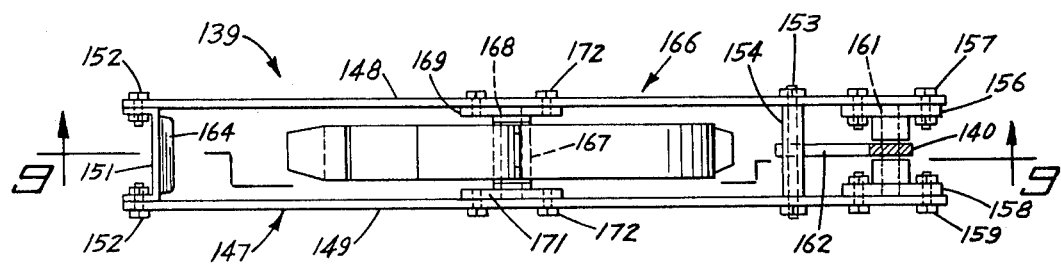
FIG. 8 is a plan view of one earthworking apparatus usable with the implement of the invention.
Figure 9:
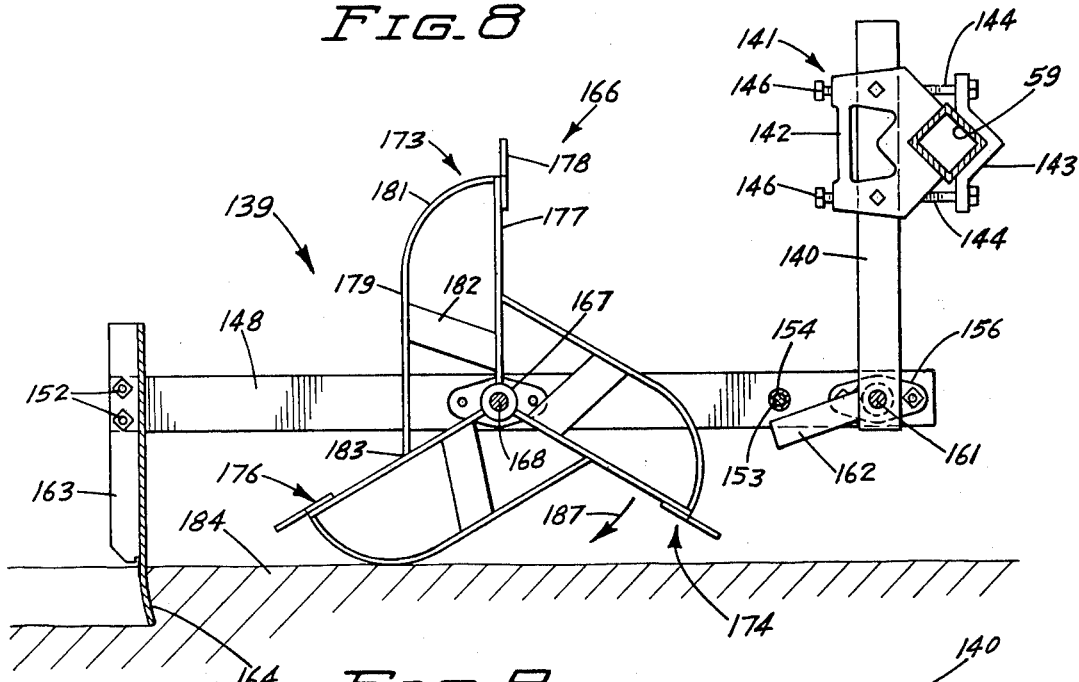
FIG. 9 is a sectional view taken along line 9—9 of FIG. 8 showing the earthworking tool in the down position.
Figure 10:
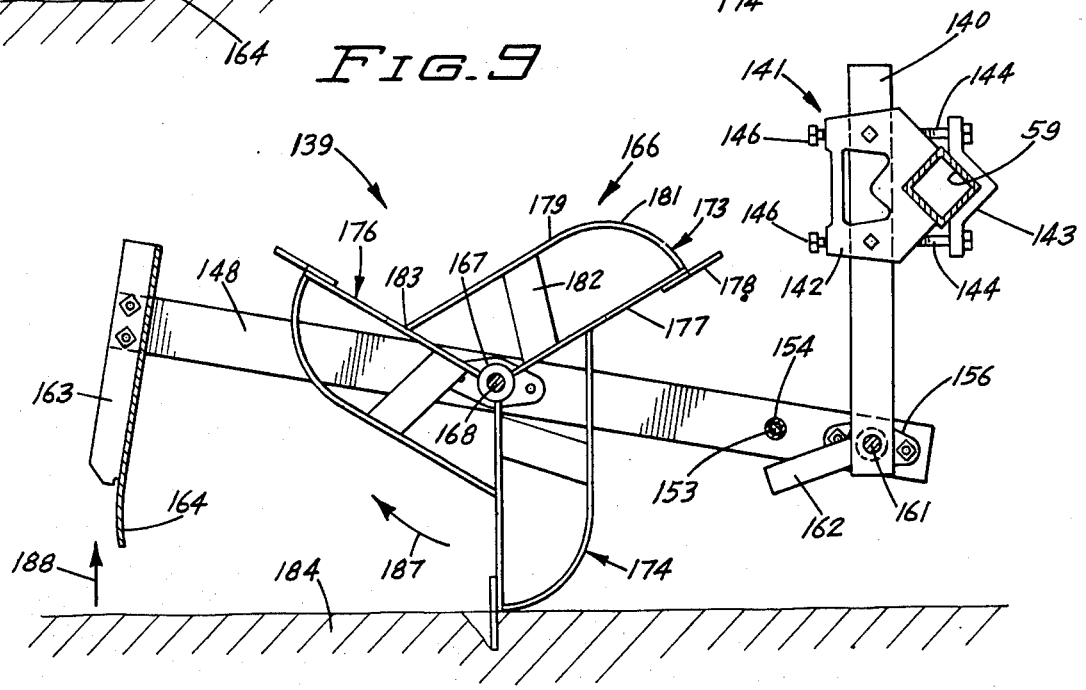
FIG. 10 is a sectional view similar to FIG. 9 showing the earthworking tool in the raised position.

Referring to FIGS. 8–10, there is shown an earthworking assembly indicated generally at 139 mounted on the tool bar 59. Earthworking assembly 139 is operable to sequentially place holes, basins or pockets in the soil to check water runoff, hold snow, and prevent soil erosion. In irrigation areas, the holes are used to collect the water between rows of crops.

Earthworking assembly 139 has an upright standard 140. The upper end of standard 140 is connected to tool bar 59 with a clamp indicated generally at 141. Clamp 141 is identical in structure to clamp 88. Clamp 141 has a body 142 having an upright opening or passage for accommodating standard 140. A back or retaining member 143 is connected to body 142 with a pair of bolts 144. Bolts 144 mount clamp 141 on the tool bar 59. Body 142 carries adjusting and holding bolts 146 used to fix the position of the standard 140 on body 142. Located rearwardly of the lower end of standard 140 is a frame indicated generally at 147. Frame 147 has rearwardly directed side members 148 and 149. Rear portions of side members 148 and 149 are connected with a transverse end member 151. The lower end of member 151 extends downwardly and forms a digging or lower end section 164. Section 164 is an earthworking tool indicated generally at 163. A plurality of bolts 152 attach member 151 to the side members 148 and 149. The forward ends of side members 148 and 149 are connected together with a transverse bolt 153. Bolt 153 extends through a sleeve 154 located between side members 148 and 149.

Side members 148 and 149 are pivotally connected to the lower end of standard 140 with a transverse shaft 161. Shaft 161 is located in a first bearing 156 and a second bearing 158. A plurality of bolts 157 connect the first bearing to side member 148. In a similar manner, bolts 159 connect the second bearing 158 to side member 149.

The lower end of standard 140 has a rearwardly and downwardly extended stop leg 162. The stop leg 162 has a length to engage the sleeve 154 to limit the downward movement of the frame 147.

Located between the side members 148 and 149 is a rotatable lifting wheel indicated generally at 166. Wheel 166 has a center hub 167 rotatably mounted on a transverse axle 168. Axle 168 is secured to a first plate 169 and a second plate 171. Bolts 172 attach the plates to side members 148 and 149, respectively. Wheel 166 has three outwardly directed spoke members 173, 174 and 176. The members 173, 174 and 176 are circumferentially spaced from each other approximately 120°. Each spoke member is identical in construction. The following description is limited to spoke member 173.

Spoke member 173 has a radial plate 177. An outwardly directed cleat or lug 178 is attached to the outer end of plate 177. Positioned rearwardly of plate 177 is a back 179. The outer end of back 179 has a forwardly curved section 181 attached to the outer end of plate 177. A brace 182 connects the midsection of back 179 to the inner end of plate 177. The inner end of back 179 is secured at 173 to a midsection of adjacent radial plate 177A.

In use, on forward movement of the implement over the soil 184, as indicated by arrow 186, lifting wheel 166 will be rotated in the direction of arrow 187. As wheel 166 rotates, it pivots the frame 147 about the axle 161 in upward and downward directions, as indicated by arrow 188. This sequentially raises and lowers the digging tool 163 into and out of the soil, thereby producing a series of longitudinal basins or trenches in the soil. The lugs 178 dig into the soil. The curved section 181 functions as a stop or gauge to prevent the lugs 178 from moving deep into the soil and thereby prevent lifting of the earthworking tool 163 from the soil. The circumferential space between the back 179 and adjacent plate 177 is a sufficient distance so that the frame 147 will quickly and forcefully move down, thereby forcing the earthworking tool 163 into the soil. This produces a sharp depression or trench in the soil as the tool is quickly moved into and out of the soil as the implement is moved in the forward direction.

Referring to FIGS. 11 to 13, there is shown a modification of the hitch assembly indicated generally at 200 for mounting the transverse beam 201 of a machine, earthworking implement or planter onto the three-point hitch of a draft vehicle, such as the three-point hitch of an agricultural tractor. Hitch assembly 200 comprises a pair of generally upright members or bars 202 and 203. The members 202 and 203 have lower ends 202A and 203A projected downwardly from the beam 201. A first clamp indicated generally at 204 mounts the member 202 on beam 201. In a similar manner, a second clamp 206 mounts the member 203 on beam 201. The clamps 204 and 206 are identical and can be the clamps shown in U.S. Pat. No. 3,642,333 or in U.S. Pat. No. 3,825,358. The following description is limited to clamp 206.

As shown in FIG. 13, clamp 206 has a body 207 accommodating the member 203. A V-shaped back 208 is clamped to the beam 201 with bolts 209 which extend from body 207 to the back 208 on opposite sides of beam 201. Body 207 carries longitudinal or first adjusting and holding bolts 211 which clamp the member 203 in the body in a first direction. Second side adjusting and holding bolts 212 clamp the member 203 in the body 207 in a second or side direction. The bolts 211 and 212 cooperate with captive nuts (not shown) located in recesses within body 207.

Referring to FIG. 11, a cross bar 213 extends between the lower ends 202A and 203A of the members 202 and 203. A first pin 214 extends through a hole in the end 202 and is threaded into one end of cross bar 213. In a similar manner, a second pin 216 projects through a hole in the end 203A and is threaded into the opposite end of cross bar 213. Pins 214 and 216 are adapted to be mounted on the draft links of a three-point hitch in the manner similar to the pins 47 and 49 as shown in FIG. 1. Located between the clamps 204 and 206 is a third clamp 217 mounted on beam 201. Third clamp 217 carries an upright member 218 adapted to be connected to the control link of the three-point hitch. The clamp 217 is identical in structure with the clamp 206. The upright member 218 is secured to the clamp 217 with adjusting and holding bolts 219. Bolts 219 permit the upright member 218 to be vertically adjusted thereby adjust the position of the member 28 according to the requirements of the three-point hitch or earthworking implement. The members 202 and 203 are also vertically adjustable relative to the beam 201 as the adjusting and holding bolts 211 and 212 can be released so that the members 202 and 203 can move relative to the bodies of the clamps.

A pair of forwardly directed arms 220 and 221 are secured to the top of the upright member 218. Arms 220 and 221 have transverse holes 22 in the forward ends thereof to accommodate a pin to pivotally connect the control link to the arms. Holes 222 are in general vertical alignment with the pins 214 and 216. In other words, pins 214 and 216 and holes 222 are positioned in generally the same vertical plane.

Referring to FIGS. 14 to 16 there is shown a modification of the row guide structure indicated generally at 224 for guiding the earthworking implement so that earthworking tools will work the soil between the rows of crops or for guiding other implements as seeders, herbicide incorporators and the like in the field. The tools can be the dual discs or weeder blades shown in U.S. Pat. No. 3,642,333. Row guide structure 224 is mounted on a transverse tool bar 223. Tool bar 223 is connected with a plurality of parallel linkages, as parallel linkages 61 and 62 shown in FIGS. 1 and 2, to the beam of the implement. The row guide structure 224 has a guide and gauge wheel assembly indicated generally at 225 and a furrowing tool assembly indicated generally at 226. A clamp 227 mounts the guide and gauge wheel assembly 225 to the tool bar 226. Guide and gauge wheel assembly includes a generally L-shaped standard 228 and a wheel 229. Wheel 229 is rotatably mounted on a lateral axle 230 secured to the lower forwardly directed portion of standard 228. As shown in FIG. 14, wheel 229 has convex sides 229A and 229B that join at a central peripheral rib or rim 229C. Wheel 229 can be the same structure as the wheel 132 shown in FIG. 7.

Furrowing tool assembly 226 has a rearwardly directed generally flat bar or member 231. The forward end of bar 231 is mounted in a clamp 232. The clamp 227 and 232 are identical in construction and can be the same as clamps shown in U.S. Pat. Nos. 3,642,333 and 3,825,358. Clamp 232 has a body 233 and a back 234. A pair of bolts 236 attached to the body and back mount the clamp 232 on the tool bar 223. Bar 231 is adjustably held in the body 232 with first adjusting and holding bolts 237 and second adjusting and holding bolts 238. An upright standard 239 is located adjacent the rear end of bar 231. A holder indicated generally at 241 connects the standard 239 to the bar 231. Holder 241 is a generally U-shaped member having side flanges that are pivotally mounted on the rear portion of bar 231 with a transverse bolt and nut assembly 242. A generally upright back member or bar 243 is located between the flanges 242 and are secured to the flanges. Bar 243 is spaced from the rear portion of holder 241 to provide a generally rectangular upright opening for accommodating standard 239. A stop bolt 244 mounted on the top of holder 241 is threaded through a block 245 located in holes in the side flanges of holder 241. The lower end of the stop bolt 244 engages the top of bar 232 to hold the standard 239 in a generally forward and upright normal earthworking position.

A pair of bolts 246 mounted on the back of holder 244 extend through captive nuts 246A to clamp the standard 239 into in engagement with the flat face or surface 247 of the bar 243. Standard 239 is resiliently urged or biased in a forward direction by a tension spring 248. One end of the spring 248 is connected to the lower end of bar 243. The opposite end of the spring is connected to a generally L-shape bracket 249. Nuts 251 threaded on the bolts 237 secure the bracket 249 to the body 233 of clamp 232. An eye bolt 252 connects the spring 248 to the bracket 249. Nuts 253 threaded on the eye bolt adjust the tension of spring 248.

An earthworking tool 254 is releasably mounted on the lower end of standard 239. The tool is retained on the standard with a collar 256. The tool 254 is identical in construction to the tool 96 as shown in FIGS. 3, 4 and 5.

In use, as shown in FIG. 14, wheel 229 is located in longitudinal alignment with the standard 239. One forward movement of the implement wheel 229 follows a longitudinal furrow in the earth made in a previous cultivation or planting operation. Furrowing tool assembly 226 makes a new longitudinal furrow into the earth so that the guide wheel of the next cultivation will guide the earthworking implement in a predetermined position relative to the rows of crops. When the earthworking tool 254 hits a solid object, as a rock, the standard 239 will move backward or pivot about the bolt 242 in the direction of the arrow 257 as shown in FIG. 16. Tool 254 will move upwardly over the object. Spring 248 will bias the standard 239 back to its generally upright position once the tool 254 has passed over the object. The standard 239 will return to its generally upright position as determined by the stop bolt 244.

Referring to FIGS. 17–20, there is shown an agromomic process of field crop production and soil management which utilizes the implement and row guide means for the implement of the invention. The field crops are row crops, as beets, corn, beans, sorgum and the like. The following example is directed to the sugar beet culture.

Referring to FIG. 17, there is shown an earthworking implement indicated generally at 300 for preparing the seed bed in the soil 301 to receive the beet seeds. The implement 301 has a first earthworking tool 302 operable to provide a loose top layer of soil 303. A second earthworking implement 304 trails the first earthworking implement 302 and is operable to form a first compact bottom layer of soil 306 and a loose top layer of soil 307. The second earthworking tool 304 compacts the lower portion of the loose layer 303 and reworks the top portion of the layer of 303 to form the compact layer 306 and the loose layer 307 of the soil. Layer 306 being compressed has less air voids than loose top layer 307. The second earthworking tool 304 functions to provide a relatively constant working depth so that the layer 307 has a relatively uniform thickness or depth.

As shown in FIG. 18, seeds 308 are placed on top of the compact layer 306 and are covered with the loose layer 307. The seeds 308 are preferably located between layers 306 and 307 and at a relatively uniform depth in the seed bed. The seeds can be placed in the compact soil layer 306. The compact layer 306 being devoid of air voids and coarse material provides for a uniform capillary action of moisture to the seeds providing for uniform germination and early and strong development of the plants. The loose layer 307 functions as a cover layer to minimize the loss of soil moisture from the seed bed.

Earthworking implement 300 has a transverse tool bar 309 connected to a hitch 311 adapted to be mounted on the three point hitch of a draft vehicle as a tractor. A frame 312 is secured and extends rearwardly from the tool bar 309. A strut 313 extends from the top of hitch 311 to the rear of frame 312 to hold the frame 312 in a generally horizontal position. The first earthworking implement 302 comprises a harrow 314. The harrow 314 has a plurality of earthworking teeth 316. The teeth 316 can be rigid spike members, conical tines, chisel points, or spring tines. A connecting structure 317, as a chain or the like is used to connect the forward end of harrow 314 to a portion of frame 316. The harrow 314 has an upwardly directed hook 318 connected to a separate portion of the frame 312. A plurality of side-by-side harrows may be used to work the soil. Harrow 314 can be disconnected from frame 312 and replaced with a different type of earthworking tool.

A second frame 319 is located behind the first frame 312. Pivots 321 connect the frame 319 to the frame 312. An upwardly directed arm 322 is connected to a compression link 323. The compression link 323 leads to the top of the hitch 311. A plurality of hydraulic cylinders 324 are connected to the arm 322 and the frame 319. The cylinders 324 function to force the frame 319 in a downward direction so as to force the second earthworking tool 304 positively into the ground.

Second earthworking tool 304 has a frame 326 carrying a front roller 327 and a rear roller 328. The rollers 327 and 328 are elongated generally cylindrical members having a plurality of circumferentially spaced spiral blades that cut and work the soil. A short link or chain 329 connects the forward end of the frame 326 to the harrow 314. The midportion of the frame 326 is engaged with connecting structure 321 which forms a compression member between the rear portion of frame 319 and the frame 326. In this manner the downward force applied to frame 319 by cylinders 324 is transferred to the second earthworking tool 304.

In use, the implement 300 is moved in a forward direction as shown by arrow 322. The first earthworking tool 302 works a top layer of the soil 301 to form the loose soil layer 302. The rollers 327 and 328 being forced into the ground through the action of the hydraulic cylinders 324 compact the bottom portion of the layer 302 to form the bottom firm soil layer 306. The rollers also work the top portion of the layer 303 to form the loose top soil layer 307.

Referring to FIG. 19, a draft tractor 333 carrying the rear mounted beam 334 and tool bar 335 through the three-point hitch of the tractor. Tractor functions to pull the implement over the seed bed 336. A plurality of material dispensing units 338, as herbicide incorporators, or planter units, are attached to the tool bar 335 to dispense or sow material into the seed bed. An example of the incorporator is shown in U.S. Pat. No. 3,741,137. An example of a planter unit is shown in U.S. patent application Ser. No. 417,741 filed Nov. 21, 1973, now U.S. Pat. No. 3,886,875. Other types of herbicide incorporators and planters can be used with the tool bar 335. A plurality of furrowing tool assemblies 337 are attached to the tool bar 334 to make longitudinal soil tracks or furrows 339 and furrows 341 in the seed bed 336.

When the units 338 are incorporators, the longitudinal furrows 339 and 341 are placed in the soil. These furrows are used by the tractor and planter during the planting of the seeds in the seed bed. The planter is provided with row guide assemblies 343 having guide wheels which follow or ride in the furrows 339. Row guide assemblies are identical in structure and operation to row guide assemblies 95 and 224 shown in FIGS. 2 and 15. The front tractor wheels 342 follow the furrows 341. This guiding system is hereinafter described with reference to the cultivation of the earth between the rows of crops 349 as shown in FIG. 20.

Referring to FIG. 20, the tractor 333 has a pair of front wheels 342. The wheels 342 have tires having a generally convex shape so that the wheels will follow and ride in the furrows 341. The beam 334 is mounted on the three-point hitch of tractor 333. Tool bar 335 is connected to beam 334 with a plurality of parallel linkages. A plurality of row guide structures 343 are secured to separate portions of the tool bar 335. The row guide structures have guide wheels 344 which follow and ride in the furrows 339. Each row guide structure has furrowing tools 346 operable to make new longitudinal furrows 347 and 348 in the soil. The furrows 347 and 348 are located between the selected rows of crops 349. The furrows 347 and 348 are used in subsequent cultivations to guide the tractor and the cultivator. The cultivation tools attached to the tool bar 334 can be the tools and tool holder, shown in U.S. Pat. No. 3,642,333. Other earthworking tools can be attached to the tool bar 334 to work the earth between the rows of crops.

While there have been shown and described preferred embodiments of the implement, row guide structure and method, hitch assembly, ditcher and method of field crop production and soil management, it is understood that modifications and changes may be made in the structures and method by those skilled in the art without departing from the invention.

The embodiments of the invention in which an exclusive property or privilege is claimed are defined as follows:

1. An earthworking implement mountable on a draft vehicle comprising: a transverse beam, hitch means for connecting the beam to the draft vehicle, transverse tool bar means located rearwardly of the beam, linkage means connecting the tool bar means to the beam, and row guide means mounted on the tool bar means for guiding the implement along a furrow in the ground, said row guide means including a rotatable resilient wheel having convex side walls joined to a circular center section surrounding an annular chamber, first support means mounting the wheel on the tool bar means, a furrowing tool located behind the wheel, and second support means mounting the furrowing tool on the tool bar means behind the wheel and in general longitudinal alignment with the wheel.

2. The implement of claim 1 wherein: the hitch means includes a pair of downwardly directed first members, first clamp means mounting the members on laterally spaced portions of the beam, an upwardly directed second L-shaped member having a forward directed section, and second clamp means mounting the second L-shaped member on the beam between the first clamp means.

3. The implement of claim 2 wherein: the first clamp means and second clamp means each have first means to transversely hold the members on the respective clamp means, and second means to longitudinally hold the members on the respective clamp means.

4. The implement of claim 2 including: a transverse member extended between and connected to lower sections of the first members.

5. The implement of claim 1 wherein: the second support means includes a standard having a rearwardly directed section and a generally vertical section, said furrowing tool being mounted on the lower end of said vertical section, and means releasably connecting the furrowing tool to the vertical section.

6. The implement of claim 5 wherein: said means releasably connecting the furrowing tool to the vertical section includes means between the vertical section and furrowing tool to position the furrowing tool on the vertical section, and a collar holding the furrowing tool on the vertical section.

7. The implement of claim 5 including: third clamp means mounting the rearwardly directed section to the tool bar means, said third clamp means having first means to transversely hold the rearwardly directed section and a second means to longitudinally hold the rearwardly directed section.

8. The implement of claim 1 wherein: the first support means includes an L-shaped member having a forwardly directed leg, means rotatably mounting the wheel to a forward section of the leg, and clamp means mounting the L-shaped member on the tool bar means.

9. The implement of claim 1 wherein: the row guide means includes a plurality of row guiding assemblies, each assembly having one said rotatable resilient wheel having convex curved side walls joined to an outer peripherial circular center section surrounding an annular chamber, one said first support means mounting the wheel on the tool bar means, one said furrowing tool located behind the wheel for making a longitudinal furrow in the soil, and one said second support means mounting the tool on the tool bar means behind the wheel and in general longitudinal alignment with the wheel.

10. The implement of claim 1 wherein: the furrowing tool includes a bar connected to the second support means, an upright standard, said furrowing tool being mounted on the lower end of the standard, a holder pivotally connected to the bar, means mounting the standard on the holder, stop means cooperating with the bar to locate the standard in a generally upright position and permit movement of the standard in a rearward direction, and biasing means urging the standard to a forward upright position determined by the stop means.

11. The implement of claim 10 wherein: the second support means includes a clamp mounted on the tool bar, bolt and nut means securing the bar to the clamp, a bracket mounted on the clamp with said bolt and nut means, said biasing means being connected to said bracket.

12. The implement of claim 10 wherein: the holder is a U-shaped member, and means pivotally mounting the U-shaped member to the bar.

13. The implement of claim 10 wherein: the holder is a U-shaped member having side flanges, a back member located between and secured to the side flanges, said standard being engageable with the back member with the means mounting the standard on the holder, said biasing means being connected to the back member.

14. An earthworking implement mountable on a draft vehicle comprising: a transverse beam, hitch means for connecting the beam to the draft vehicle, transverse tool bar means located rearwardly of the beam, linkage means connecting the tool bar means to the beam, earthworking means mounted on the tool bar means to work soil between rows of crops, and row guide means mounted on the tool bar means for guiding the earthworking means along the rows of crops, said row guide means including a rotatable wheel having convex curved side walls joined to a circular center section adapted to follow a longitudinal furrow in the soil, first support means mounting the wheel on the tool bar means, a furrowing tool located behind the wheel, and second support means mounting the furrowing tool on the tool bar means behind the wheel and in general longitudinal alignment with the wheel.

15. The implement of claim 14 wherein: the hitch means includes a pair of downwardly directed first members, first clamp means mounting the members on laterally spaced portion of the beam, an upwardly directed second L-shaped member having a forward directed section, and second clamp means mounting the second L-shaped member on the beam between the first clamp means.

16. The implement of claim 15 wherein: the first clamp means and second clamp means each have first means to transversely hold the members on the respective clamp means and second means to longitudinally hold the members on the respective clamp means.

17. The implement of claim 15 including: a transverse member extended between and connected to lower sections of the first members.

18. The implement of claim 14 wherein: the second support means includes a standard having a forwardly directed section and a generally vertical section, said furrowing tool being mounted on the lower end of said vertical section, and means releasably connecting the furrowing tool to the vertical section.

19. The implement of claim 18 wherein: said means releasably connecting the furrowing tool to the vertical section includes means between the vertical section and furrowing tool to position the furrowing tool on the vertical section, and a collar holding the furrowing tool on the vertical section.

20. The implement of claim 18 including: third clamp means mounting the forwardly directed section to the tool bar means, said third clamp means having first means to transversely hold the forwardly directed section, and a second means to longitudinally hold the forwardly directed section.

21. The implement of claim 14 wherein: the first support means includes an L-shaped member having a forwardly directed leg, means rotatably mounting the wheel to a forward section of the leg, and clamp means mounting the L-shaped member on the tool bar means.

22. The implement of claim 14 wherein: the row guide means includes a plurality of row guiding assemblies, each assembly having one said rotatable wheel having convex curved side walls joined to an outer peripheral circular center section, one said first support means mounting the wheel on the tool bar means, one said furrowing tool located behind the wheel for making a longitudinal furrow in the soil, and one said second support means mounting the tool on the tool bar means behind the wheel and in general alignment with the wheel.

23. An earthworking implement mountable on a draft vehicle comprising: transverse tool bar means located rearwardly of the draft vehicle, means for connecting the tool bar means to the draft vehicle, earthworking tool means mounted on the tool bar means for working the soil between longitudinal rows of crops, row guide means mounted on the tool bar means for guiding the earthworking tool means along the sides of rows of crops, said row guide means including a plurality of row guide assemblies mounted on separate portions of the tool bar means, each assembly having a rotatable wheel having convex curved side walls joined to a circular center section, first support means mounting the wheel on the tool bar means, said first support means including an L-shaped member having a forwardly directed leg, means rotatably mounting the wheel to a forward section of the leg, clamp means mounting the L-shaped member on the tool bar means, a furrowing tool located behind the wheel, and second support means mounting the furrowing tool on the tool bar means behind the wheel and in general longitudinal alignment with the wheel.

24. The implement of claim 23 wherein: the second support means includes a standard having a rearwardly directed section and a generally vertical section, said furrowing tool being mounted on the lower end of the vertical section, and means releasably connecting the furrowing tool to the vertical section.

25. The implement of claim 24 wherein: said means releasably connecting the tool to the vertical section includes means between the vertical section and the tool to position the tool on the vertical section, and a collar holding the tool on the vertical section.

26. The implement of claim 24 including: second clamp means mounting the rearwardly directed section to the tool bar means.

27. The implement of claim 14 wherein: the wheel includes convex curved side walls joined to a circular rib section and a base, said side walls and base surrounding an annular chamber having a general triangular transverse cross section.

28. The implement of claim 23 wherein: the wheel includes convex curved side walls joined to a circular rib section and a base, said side walls and base surrounding an annular chamber having a general triangular transverse cross section.

29. A draft vehicle and earthworking implement for working the soil between longitudinal rows of crops comprising: said draft vehicle having front steering wheels operable to follow longitudinal furrows in the soil located between the rows of crops, said steering wheels having convex curved side walls, said implement having a transverse beam, hitch means connecting the beam to the draft vehicle, a transverse tool bar means located rearwardly of the beam, linkage means connecting the tool bar means to the beam, earthworking tool means mounted on the tool bar means for working the soil between the longitudinal rows of crops, a plurality of row guide assemblies mounted on separate portions of the tool bar means for guiding the earthworking tool means along the sides of the rows of crops, each row guide assembly having a rotatable wheel rotatable along a longitudinal furrow in the soil between the rows of crops, said wheel having convex curved side walls joined to a circular center section, first support means mounting the wheel on the tool bar means whereby the wheel is aligned with a longitudinal furrow in the soil, a furrowing tool located behind the wheel, and second support means mounting the furrowing tools on the toor bar means behind the wheel and in general longitudinal alignment with the wheel whereby the furrowing tool, on forward movement of the draft vehicle, forms a longitudinal furrow in the soil forming a guide furrow between the rows of crops.

30. The structure of claim 29 wherein: the first support means includes a L-shaped member having a forwardly directed leg, means rotatably mounting the wheel to a forward section of the leg, and means mounting the section of the leg rearwardly thereof on the tool bar means.

31. The structure of claim 29 wherein: the second support means includes a standard having a rearwardly directed section and a generally vertical section, said furrowing tool being mounted on the lower end of the vertical section, and means connecting the furrowing tool to the vertical section.

32. The structure of claim 31 wherein: said means connecting the tool to the vertical section includes means between the vertical section and the tool to position the tool on the vertical section, and a collar holding the tool on the vertical section.

33. The structure of claim 29 wherein: each wheel has convex curved side walls joined to a base and an outer peripheral circular rib section, said side walls and base surrounding an annular air chamber.

34. The structure of claim 33 wherein: side walls have generally uniform thickness and the chamber has a general triangular transverse cross section.

35. The structure of claim 29 wherein: the hitch means includes a pair of downwardly directed L-shaped first members, first means mounting the first members on laterally spaced portions of the beam, and upwardly directed L-shaped second member having a forwardly directed section, second means mounting the second member on the beam between the first means, said draft vehicle having a three-point hitch including a pair of draft arms and a control link, said first members being connected to the draft arms and said second member being connected to the control link.

* * * * *

UNITED STATES PATENT AND TRADEMARK OFFICE
CERTIFICATE OF CORRECTION

PATENT NO. : 3,998,275
DATED : December 21, 1976
INVENTOR(S) : Fred W. Eisenhardt It is certified that error appears in the above-identified patent and that said Letters Patent are hereby corrected as shown below:

Column 8, line 27, "22" should be --222--.

Column 15, line 13, "toor" should be --tool--.

Signed and Sealed this

Twelfth Day of April 1977

[SEAL]

Attest:

RUTH C. MASON
*Attesting Officer*

C. MARSHALL DANN
*Commissioner of Patents and Trademarks*